(12) United States Patent
Ooneda

(10) Patent No.: US 9,780,714 B2
(45) Date of Patent: Oct. 3, 2017

(54) MOTOR CONTROL DEVICE AND ELECTRIC COMPRESSOR

(71) Applicant: CALSONIC KANSEI CORPORATION, Saitama-shi, Saitama (JP)

(72) Inventor: Yousuke Ooneda, Saitama (JP)

(73) Assignee: CALSONIC KANSEI CORPORATION, Saitama-Shi (JP)

( * ) Notice: Subject to any disclaimer, the term of this patent is extended or adjusted under 35 U.S.C. 154(b) by 0 days.

(21) Appl. No.: 14/762,344

(22) PCT Filed: Oct. 17, 2013

(86) PCT No.: PCT/JP2013/078140
§ 371 (c)(1),
(2) Date: Jul. 21, 2015

(87) PCT Pub. No.: WO2014/115382
PCT Pub. Date: Jul. 31, 2014

(65) Prior Publication Data
US 2015/0357957 A1  Dec. 10, 2015

(30) Foreign Application Priority Data
Jan. 25, 2013  (JP) .................................. 2013-012166

(51) Int. Cl.
| H02P 1/00 | (2006.01) |
| H02P 1/28 | (2006.01) |
| H02P 3/00 | (2006.01) |
| H02P 7/06 | (2006.01) |
| H02P 23/00 | (2016.01) |
| H02P 27/06 | (2006.01) |

(Continued)

(52) U.S. Cl.
CPC ........ H02P 23/0004 (2013.01); F25B 49/022 (2013.01); H02P 27/06 (2013.01); H02P 29/0241 (2016.02)

(58) Field of Classification Search
CPC .................. H02P 23/0004; H02P 29/0241
USPC .......................................... 318/504
See application file for complete search history.

(56) References Cited

U.S. PATENT DOCUMENTS 6,049,185 A * 4/2000 Ikeda ................. B60H 1/00392
                                                    318/442
6,097,107 A * 8/2000 Ikeda ................. B60H 1/00428
                                                    307/10.1

(Continued)

FOREIGN PATENT DOCUMENTS

| JP | 7-325629 A | 12/1995 |
| JP | 2002-186259 A | 6/2002 |
| JP | 2002-315306 A | 10/2002 |

*Primary Examiner* — Erick Glass
(74) *Attorney, Agent, or Firm* — Foley & Lardner LLP

(57) ABSTRACT

A motor control device of the present invention supplies a detection current to a motor at predetermined time intervals, detects a voltage between the both ends of a smoothing capacitor when the detection current is supplied, and determines whether a connector is inserted or unplugged based on a change in the voltage between the both ends of the smoothing capacitor. Furthermore, if determining that the connector is unplugged, the motor control device decreases the voltage between the both ends of the smoothing capacitor to or below a defined value by discharging the smoothing capacitor.

5 Claims, 4 Drawing Sheets

(51) Int. Cl.
*F25B 49/02* (2006.01)
*H02P 29/024* (2016.01)

(56) References Cited

U.S. PATENT DOCUMENTS

| | | | |
|---|---|---|---|
| 8,441,224 B2* | 5/2013 | Sumi | B60L 3/04 |
| | | | 180/65.265 |
| 2002/0148242 A1 | 10/2002 | Goto et al. | |
| 2003/0034761 A1* | 2/2003 | Goto | B60H 1/00428 |
| | | | 323/282 |
| 2014/0009091 A1* | 1/2014 | Kamiya | F04B 49/10 |
| | | | 318/139 |
| 2016/0248352 A1* | 8/2016 | Shinomoto | H02M 1/32 |

\* cited by examiner

MOTOR CONTROL DEVICE AND ELECTRIC COMPRESSOR

TECHNICAL FIELD

The present invention relates to a motor control device for an electric compressor used in a vehicle air conditioner and the like.

BACKGROUND ART

For the purpose of conditioning the air in the vehicle compartment, an electric compressor compresses and supplies a refrigerant in refrigeration cycles. In general, the electric compressor is disposed in an engine room. The electric compressor like this includes: a compression mechanism unit configured to compress the refrigerant; a motor configured to rotate a rotor of the compression mechanism unit; and an inverter configured to drive the motor by supplying electric power to the motor. These components are set inside a case. A connector is connected to the case of the electric compressor. Thereby, the electric power is supplied to the electric compressor from a battery as a power supply.

In this respect, once the connector connected to the power supply is unplugged while in an active-line state, the supply of voltage from the power supply stops. Thus, voltage stored in a smoothing capacitor is discharged due to leakage current from elements in the inverter. Nevertheless, because the amount of discharge is small, there is a time lag until the voltage of the smoothing capacitor decreases to a safe voltage value. For this reason, there is a risk of electric shock. Against this background, Patent Literature 1 has been disclosed with an intention of preventing the electric shock. In a power supply apparatus disclosed in Patent Literature 1, the connector is provided with an inserted/unplugged state detecting circuit. Once the inserted/unplugged state detecting circuit detects that the connector is unplugged, the power supply apparatus discharges the voltage stored in the smoothing capacitor.

CITATION LIST

Patent Literature

Patent Literature 1: Japanese Patent Application Publication No. 7-325629

SUMMARY OF INVENTION

Technical Problem

Nevertheless, having the connector provided with the inserted/unplugged state detecting circuit, the foregoing power supply apparatus disclosed in Patent Literature 1 has problems in that the connector per se has a large size and a complicated structure, thereby resulting in high costs.

Solution to Problem

The present invention has been proposed with the foregoing situation taken into consideration. An object of the present invention is to provide a motor control device and an electric compressor which achieves cost reduction with a connecter prevented from becoming large in size and complicated.

For the purpose of solving the forgoing problem, the present invention is a motor control device configured to control a motor in an electric compressor connected to a power supply via a connector, characterized by including: a detection current supply unit configured to supply a detection current to the motor at a predetermined time interval; a voltage detection unit configured to detect a voltage between both ends of a smoothing capacitor configured to smooth a voltage from the power supply, when the detection current is supplied by the detection current supply unit; and an inserted/unplugged state determination unit configured to determine whether the connector is inserted or unplugged, based on a change in the voltage between the both ends of the smoothing capacitor which is detected by the voltage detection unit.

In addition, when the voltage between the both ends of the smoothing capacitor decreases by a predetermined value or more, the inserted/unplugged state determination unit determines that the connector is unplugged.

Furthermore, the motor control device further includes a discharge unit configured to decrease the voltage between the both ends of the smoothing capacitor to or below a defined value by discharging the smoothing capacitor when the inserted/unplugged state determination unit determines that the connector is unplugged.

Moreover, an electric compressor may be comprised of the motor control device.

DESCRIPTION OF EMBODIMENTS

Referring the drawings, descriptions will be hereinbelow provided for an embodiment to which the present invention is applied.

[Configuration of Electric Compressor]

Figure 1:
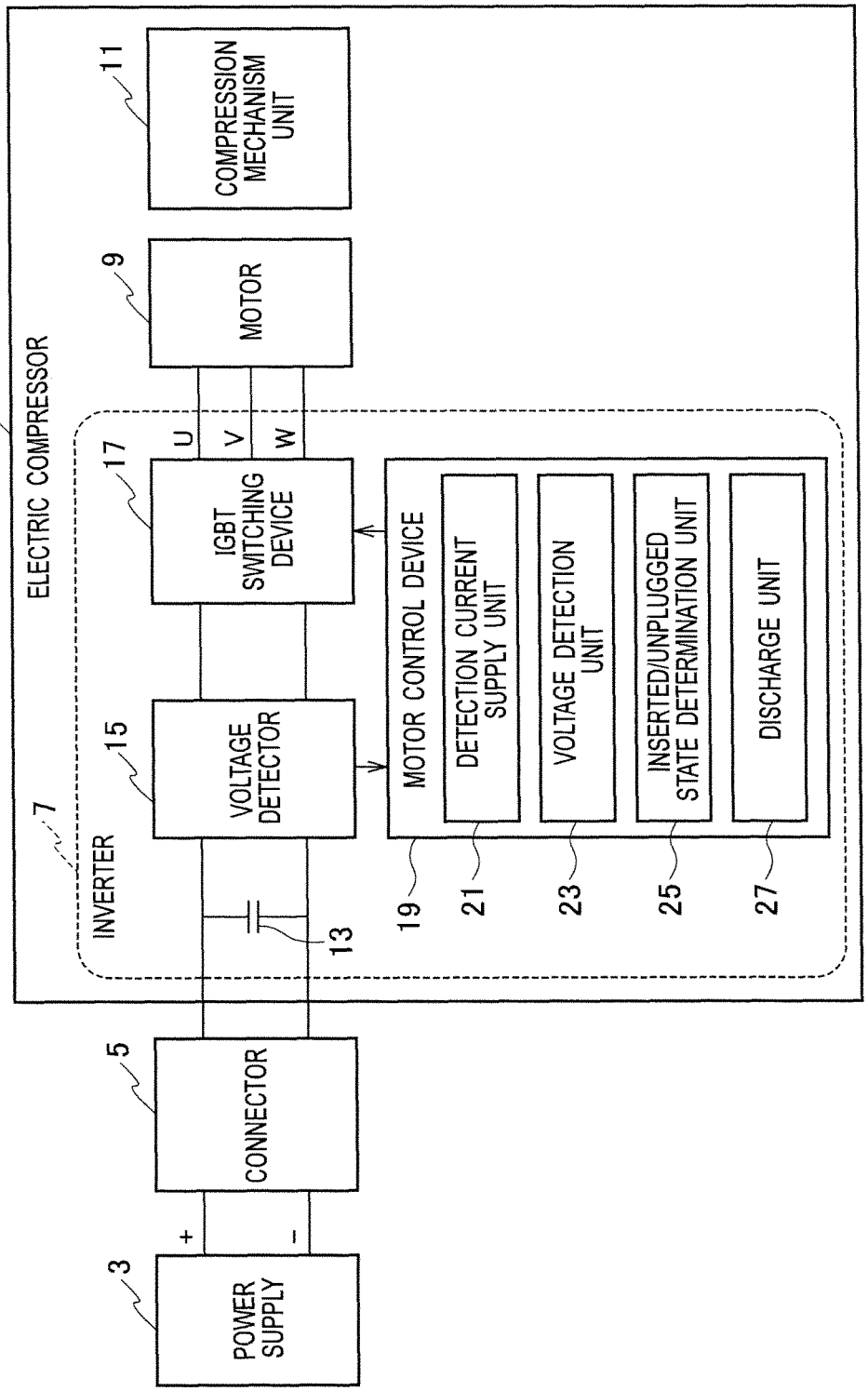
FIG. 1 is a block diagram showing a configuration of an electric compressor including a motor control device according to an embodiment of the present invention.

FIG. 1 is a block diagram showing a configuration of an electric compressor including a motor control device according to the embodiment. As shown in FIG. 1, an electric compressor 1 includes: an inverter 7 connected to a power supply 3 via a connector 5; a motor 9 driven by the inverter 7; and a compression mechanism unit 11 driven by the motor 9.

The power supply 3 is a DC power supply such as an on-board battery. The power supply 3 is connected to the connector 5 via a harness, and supplies DC power to the inverter 7.

The connector 5 electrically connects the power supply 3 and the inverter 7 by being attached to a socket provided to the electric compressor 1.

The inverter 7 converts the DC power supplied from the power supply 3 into three-phase AC power, and supplies the resultant three-phase AC power to the motor 9. The inverter 7 includes a smoothing capacitor 13, a voltage detector 15, an IGBT switching device 17 and a motor control device 19.

In this respect, the smoothing capacitor 13 smoothes the DC power supplied from the power supply 3. The voltage detector 15 detects a voltage between the both ends of the smoothing capacitor 13.

Figure 2:
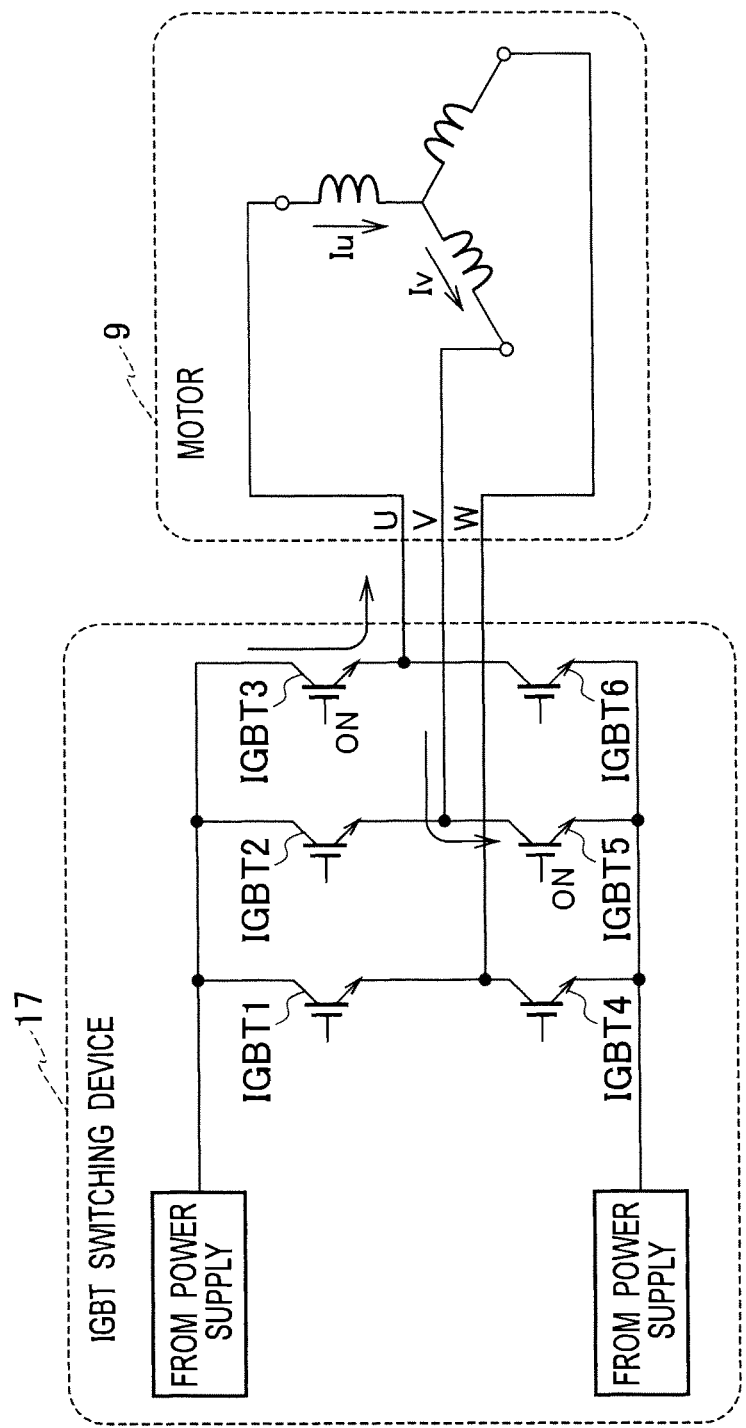
FIG. 2 is a diagram showing a configuration of an IGBT switching device.

The IGBT switching device 17 outputs the three-phase AC power including U-phase, V-phase, and W-phase using the switching elements included in the IGBT switching device 17, and thereby drives the motor 9 by PWM (Pulse Width Modulation). For example, as shown in FIG. 2, the IGBT switching device 17 includes 6 IGBTs 1 to 6 which are the switching elements, and makes a current flow to arbitrary ones of U-phase, V-phase, and W-phase by combining ONs and OFFs of the IGBTs 1 to 6. In FIG. 2, the IGBT switching device 17 makes a current flow to U-phase and V-phase by turning on the IGBTs 3 and 5. In this respect, a current value of the current flowing to U-phase and V-phase can be determined by how long the IGBTs 3 and 5 are kept ON.

The motor control device 19 controls the drive of the motor 9 by controlling the IGBT switching device 17, and also performs a process of determining whether the connector 5 is inserted or unplugged, which will be described later. To this end, the motor control device 19 includes a detection current supply unit 21, a voltage detection unit 23, and an inserted/unplugged state determination unit 25, and a discharge unit 27.

The detection current supply unit 21 supplies a detection current to the motor 9 at predetermined time intervals by controlling the IGBT switching device 17.

When the detection current is supplied by the detection current supply unit 21, the voltage detection unit 23 acquires the voltage between the both ends of the smoothing capacitor 13, which has been detected by the voltage detector 15.

The inserted/unplugged state determination unit 25 determines whether the connector 5 is inserted or unplugged, based on a change in the voltage between the both ends of the smoothing capacitor 13 which is acquired by the voltage detection unit 23. Particularly, when the voltage between the both ends of the smoothing capacitor 13 decreases by a predetermined value or more, the inserted/unplugged state determination unit 25 determines that the connector 5 is unplugged.

When the inserted/unplugged state determination unit 25 determines that the connector 5 is unplugged, the discharge unit 27 decreases the voltage between the both ends of the smoothing capacitor 13 to or below a defined value by discharging the smoothing capacitor 13.

In this respect, the motor control device 19 is formed from: a general-purpose electronic circuit including a microcomputer, a microprocessor and a CPU; and peripherals. The motor control device 19 works as the detection current supply unit 21, the voltage detection unit 23, the inserted/unplugged state determination unit 25, and the discharge unit 27 by executing the respective dedicated programs. Incidentally, although the embodiment describes the case where the motor control device 19 is used for the electric compressor, the motor control device 19 may be used to control a motor installed in other apparatuses.

The motor 9 is, for example, a three-phase AC synchronous motor, and is driven by AC power outputted from the inverter 7. Although the three-phase AC motor is shown as an example of the motor 9 of the embodiment, the motor 9 does not have to be of three-phase type as long as it is of multiphase type.

The compression mechanism unit 11 includes a cylinder housing and a rotor. The rotation of the motor 9 rotates the rotor, which compresses the refrigerant.

[Procedure for Process of Determining Whether Connector is Inserted or Unplugged]

Figure 3:
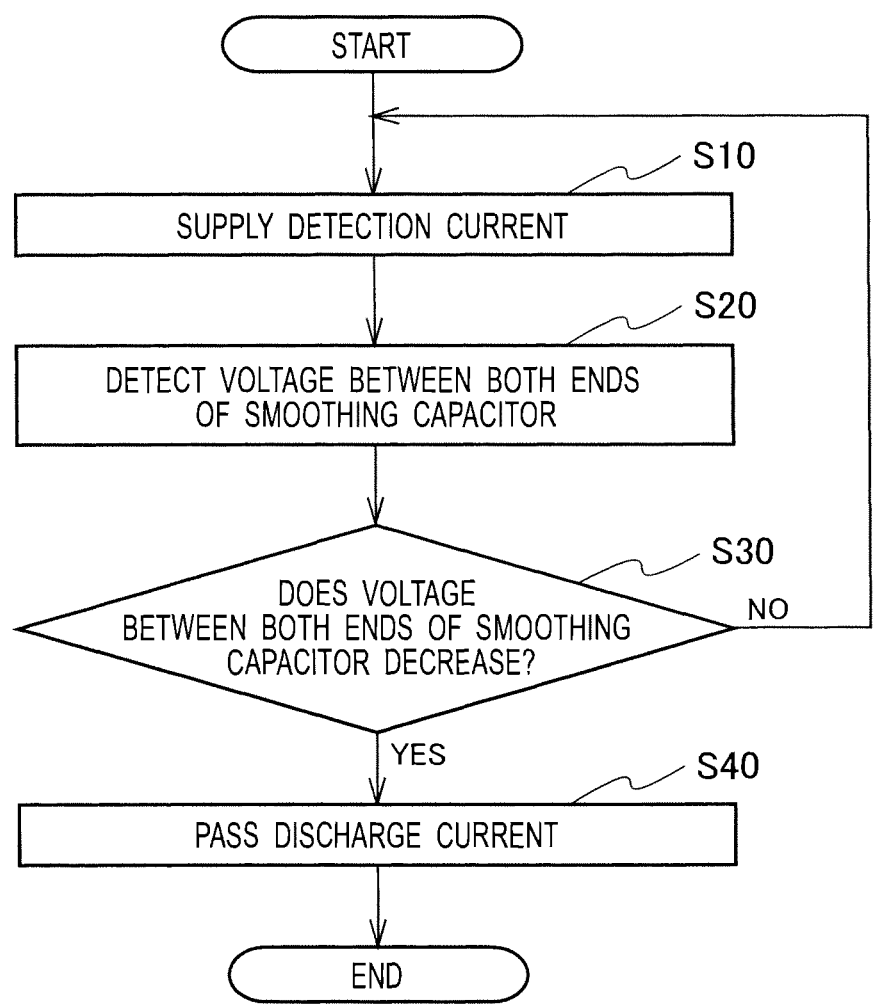
FIG. 3 is a flowchart showing a procedure in which the motor control device of the embodiment of the present invention performs a process of judging whether a connector is inserted or unplugged.
Figure 4:
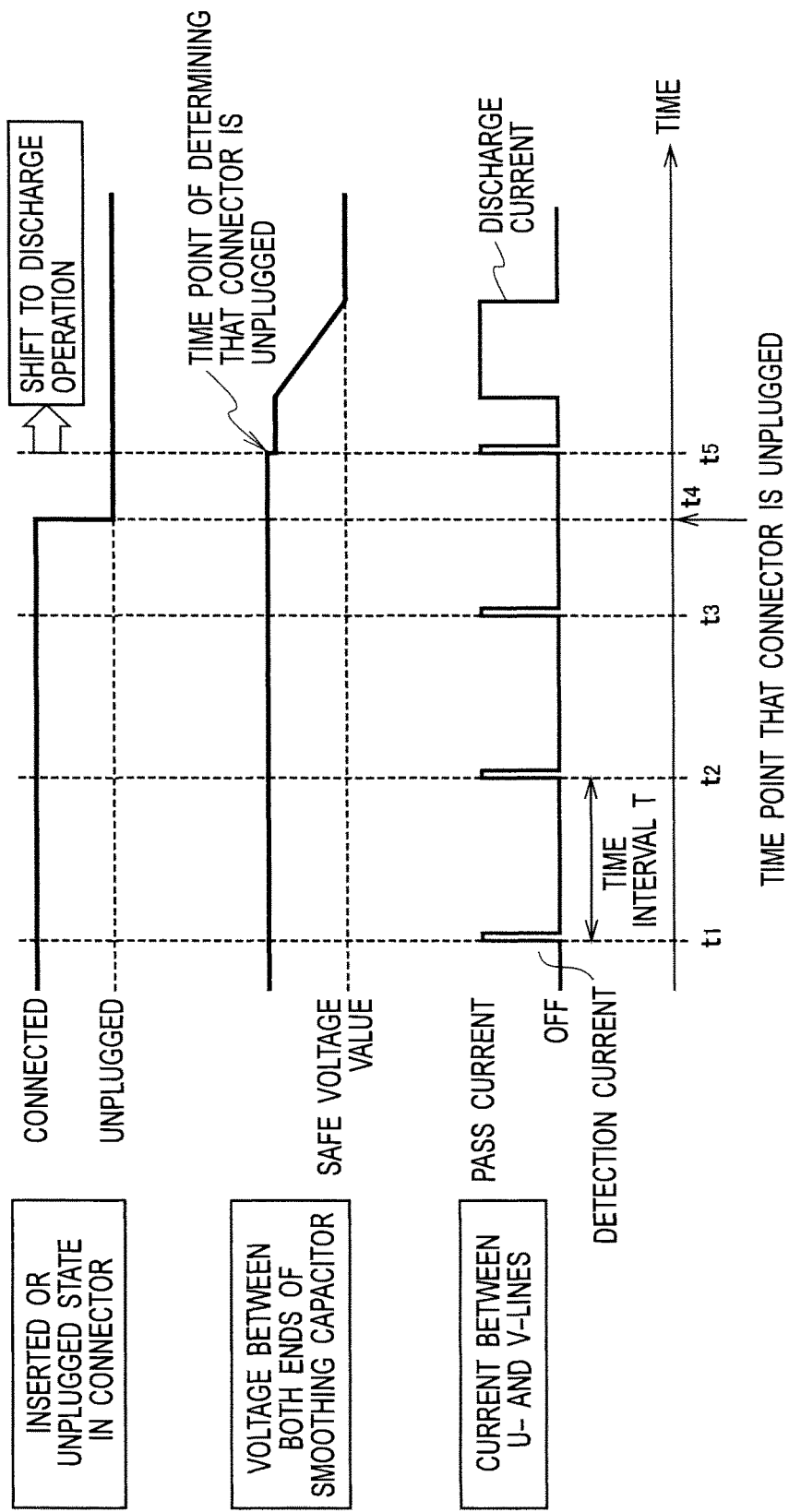
FIG. 4 is a timing chart for explaining how the motor control device of the embodiment of the present invention performs a process of judging whether the connector is inserted or unplugged.

Next, referring to a flowchart in FIG. 3 and a timing chart in FIG. 4, descriptions will be provided for a procedure in which the motor control device 19 of the embodiment performs a process of determining whether the connector is inserted or unplugged.

As shown in FIG. 3, first of all, in step S10, the detection current supply unit 21 supplies the detection current to the motor 9 at the predetermined time intervals by turning on and off the switching elements of the IGBT switching device 17. For example, as shown in FIG. 4, the detection current supply unit 21 supplies the detection current at time t1, t2, t3, t5 at the time intervals T. The time intervals T are set in a way that the detection current flows to arbitrary phases of the motor 9, and are set at a length of approximately 0.1 to 10 milliseconds. In the embodiment, for example, the time interval T are set in a way that the detection current flows to U-phase and V-phase of the motor 9. Meanwhile, the current value of the detection current is set at an infinitesimal value. This makes it possible to minimize reactive current.

Next, in step S20, the voltage detection unit 23 detects the voltage between the both ends of the smoothing capacitor 13 when the detection current is supplied. Since the voltage between the both ends of the smoothing capacitor 13 is detected by the voltage detector 15, the voltage detection unit 23 is capable of detecting the voltage between the both ends of the smoothing capacitor 13 by acquiring the voltage between the both ends of the smoothing capacitor 13 from the voltage detector 15.

Subsequently, in step S30, the inserted/unplugged state determination unit 25 determines whether the connector 5 is inserted or unplugged, based on a change in the voltage between the both ends of the smoothing capacitor 13. To put it concretely, the inserted/unplugged state determination unit 25 determines whether or not the voltage between the both ends of the smoothing capacitor 13 decreases by the predetermined value or more. If the voltage between the both ends of the smoothing capacitor 13 does not decrease by the predetermined value or more, the inserted/unplugged state determination unit 25 determines that the connector 5 is kept inserted. On the other hand, if the voltage between the both ends of the smoothing capacitor 13 decreases by the predetermined value or more, the inserted/unplugged state determination unit 25 determines that the connector 5 is unplugged. While the connector 5 is kept connected, the smoothing capacitor 13 continues to be supplied with the voltage from the power supply 3. Thus, the voltage between the both ends of the smoothing capacitor 13 does not change even though the detection current is made to flow. Contrarily, if the detection current is made to flow while the connector 5 is kept unplugged, the voltage stored in the smoothing capacitor 13 is discharged. Thus, the voltage between the both ends of the smoothing capacitor 13 decreases. Thus, the monitoring of the voltage between the both ends of the smoothing capacitor 13 by the periodic flow of the detection current makes it possible to determine whether the connector 5 is inserted or unplugged.

For example, as shown in FIG. 4, at time t1, t2, t3, the voltage between the both ends of the smoothing capacitor 13 does not change even though the detection current is made to flow, since the connector 5 is kept connected. Meanwhile, if the connector 5 is unplugged at t4, the voltage between the both ends of the smoothing capacitor 13 decrease at time t5 when the detection current is made to flow. In this respect, how much the voltage between the both ends of the smoothing capacitor 13 decreases is determined depending on the value of the detection current. For this reason, the predetermined value used for the determination on the inserted/unplugged state may be set depending on the detection current as well.

In step 30, it is determined whether the connector 5 is inserted or unplugged, as described above. If the voltage between the both ends of the smoothing capacitor 13 does not decrease by the predetermined value or more, it is determined that the connector 5 is kept connected, and the workflow returns to step 10. Subsequently, the processes in step S10 to S30 are repeatedly performed.

On the other hand, if the voltage between the both ends of the smoothing capacitor 13 decreases by the predetermined value or more, it is determined that the connector 5 is unplugged, and the workflow proceeds to step 40.

In step 40, the discharge unit 27 decreases the voltage between the both ends of the smoothing capacitor 13 to or below the defined value by discharging the smoothing capacitor 13. To put it concretely, the discharge unit 27 passes a discharge current as shown in FIG. 4 by controlling the switching elements of the IGBT switching device 17, and thereby decreases the voltage between the both ends of the smoothing capacitor 13 to or below the defined value. A current value of the discharge current may be set depending on the capacitance of the smoothing capacitor 13.

Once the discharge of the smoothing capacitor 13 is completed in this manner, the process of determining whether the connector is inserted or unplugged is terminated.

As described above in detail, the motor control device 19 of the embodiment supplies the detection current to the motor at the predetermined time intervals, and determines whether the connector 5 is inserted or unplugged based on a change in the voltage between the both ends of the smoothing capacitor 13. Thereby, no inserted/unplugged state detecting circuit need be provided to the connector 5. Accordingly, it is possible to prevent the connector 5 from becoming larger in size or complicated, and to reduce the costs.

Furthermore, since the motor control device 19 of the embodiment determines that the connector 5 is unplugged when the voltage between the both ends of the smoothing capacitor 13 decreases by the predetermined value or more, the motor control device 19 is capable of securely detecting whether the connector 5 is inserted or unplugged by monitoring the voltage between the both ends of the smoothing capacitor 13.

Moreover, when determining that the connector 5 is unplugged, the motor control device 19 of the embodiment decreases the voltage between the both ends of the smoothing capacitor 13 to or below the defined value by discharging the smoothing capacitor 13. Thereby, it is possible to decrease the voltage between the both ends of the smoothing capacitor 13 quickly once the connector 5 is unplugged, and to accordingly enhance the safety.

In addition, the application of the motor control device 19 of the embodiment to the electric compressor 1 makes it possible to prevent the connector 5 from becoming larger in size and complicated. Thus, the costs of the electric compressor 1 can be reduced. Particularly because space saving is required when the electric compressor 1 is installed in a vehicle, the prevention of the connector 5 from becoming larger in size by applying the motor control device 19 of the embodiment to the electric compressor 1 is effective in realizing the space saving.

It should be noted that the foregoing embodiment is one example of the present invention. Accordingly, the present invention is not limited to the foregoing embodiment. It is a matter of course that: the present invention may be carried out in modes other than the embodiment; and depending on designs, various changes may be made to the present invention within a scope not departing from the technical idea of the present invention.

This application claims priority to Japanese Patent Application No. 2013-012166 filed on Jan. 25, 2013, the entire contents of which are incorporated herein by reference.

INDUSTRIAL APPLICABILITY

The motor control device and the electric compressor according to one aspect of the present invention supplies the detection current to the motor at the predetermined time intervals, and determines whether the connector is inserted or unplugged based on a change in the voltage of the smoothing capacitor when supplying the detection current. Thereby, no inserted/unplugged state detecting circuit need be provided to the connector. Accordingly, it is possible to prevent the connector 5 from becoming larger in size and complicated, and to reduce the costs. For this reason, the motor control device and the electric compressor according to the one aspect of the present invention is industrially applicable.

REFERENCE SIGNS LIST 1 electric compressor
3 power supply
5 connector
7 inverter
9 motor
11 compression mechanism unit
13 smoothing capacitor
15 voltage detector
17 IGBT switching device
19 motor control device
21 detection current supply unit
23 voltage detection unit
25 inserted/unplugged state determination unit
27 discharge unit

The invention claimed is:

1. A motor control device configured to control a motor in an electric compressor connected to a power supply via a connector, comprising:
   a detection current supply unit configured to supply a detection current to the motor at a predetermined time interval;
   a voltage detection unit configured to detect a voltage between both ends of a smoothing capacitor configured to smooth a voltage from the power supply, when the detection current is supplied by the detection current supply unit; and
   an inserted/unplugged state determination unit configured to determine whether the connector is inserted or unplugged, based on a change in the voltage between the both ends of the smoothing capacitor which is detected by the voltage detection unit,
   wherein the detection current has a current value different from a current value of a current for driving the motor.

2. The motor control device according to claim 1, wherein when the voltage between the both ends of the smoothing capacitor decreases by a predetermined value or more, the inserted/unplugged state determination unit determines that the connector is unplugged.

3. The motor control device according to claim 1, further comprising a discharge unit configured to decrease the voltage between the both ends of the smoothing capacitor to or below a defined value by discharging the smoothing capacitor when the inserted/unplugged state determination unit determines that the connector is unplugged.

4. An electric compressor comprising the motor control device according to claim 1.

5. A motor control device configured to control a motor in an electric compressor connected to a power supply via a connector, comprising:
- a detection current supplying means for supplying a detection current to the motor at a predetermined time interval;
- a voltage detecting means for detecting a voltage between both ends of a smoothing capacitor configured to smooth a voltage from the power supply, when the detection current is supplied by the detection current supplying means; and
- an inserted/unplugged state determining means for determining whether the connector is inserted or unplugged based on a change in the voltage between the both ends of the smoothing capacitor which is detected by the voltage detecting mean,
- wherein the detection current has a current value different from a current value of a current for driving the motor.

* * * * *